United States Patent

Koreishi et al.

[11] Patent Number: 5,830,981
[45] Date of Patent: Nov. 3, 1998

[54] PROCESS FOR PRODUCING POLYETHYLENE TEREPHTHALATE

[75] Inventors: Hiroshi Koreishi; Yasuhiro Tanaka; Kimiyoshi Miura, all of Yamaguchi, Japan

[73] Assignee: Mitsui Petrochemical Industries, Ltd., Tokyo, Japan

[21] Appl. No.: 750,344
[22] PCT Filed: Apr. 5, 1996
[86] PCT No.: PCT/JP96/00944
  § 371 Date: Dec. 9, 1996
  § 102(e) Date: Dec. 9, 1996
[87] PCT Pub. No.: WO96/32433
  PCT Pub. Date: Oct. 17, 1996

[30] Foreign Application Priority Data
Apr. 10, 1995 [JP] Japan ................................... 7-084299

[51] Int. Cl.⁶ .................................................. C08G 63/78
[52] U.S. Cl. ...................... 528/283; 528/274; 528/308.2; 528/308.4; 528/308.5; 528/308.6; 528/499; 528/502; 528/503; 524/714; 524/765; 524/773
[58] Field of Search ..................... 528/274, 283, 528/308.2, 308.4, 308.5, 308.6, 499, 502, 503; 524/714, 765, 773

[56] References Cited

U.S. PATENT DOCUMENTS 5,241,046  8/1993  Shiraki et al. .

FOREIGN PATENT DOCUMENTS 5222171A  8/1993  Japan .

Primary Examiner—Samuel A. Acquah
Attorney, Agent, or Firm—Sherman and Shalloway

[57] ABSTRACT

A process for producing a polyethylene terephthalate in which the amount of the oligomers, such as cyclic trimer etc., is lower and which causes metal mold staining to occur difficultly. The process comprises an esterification stage in which dicarboxylicacids including mainly terephthalic acid or ester-forming derivatives of such acids are esterified with glycols including mainly ethylene glycol or with ester-forming derivatives of such glycols; a liquid phase polycondensation stage in which the esterified product obtained in the esterification stage is subjected to a polycondensation in a liquid phase containing a polycondensation catalyst and having a content of an alkaline solubilizing agent of 0.4 mole or less per mole of the polycondensation catalyst with heating; a solid phase polycondensation stage in which the polycondensation product obtained in the liquid phase polycondensation stage is heated at a temperature below the melting point of the product in an inert atmosphere; and an aqua-treatment stage in which the polycondensation catalyst is deactivated by contacting the polycondensation product obtained in the solid phase polycondensation stage with water.

The polyethylene terephthalate obtained by this process is suitable as the material for containers to be charged with drinks.

7 Claims, 1 Drawing Sheet

PROCESS FOR PRODUCING POLYETHYLENE TEREPHTHALATE

FIELD OF THE TECHNIQUE

The present invention relates to a process for producing a polyethylene terephthalate to be used for molding various products including bottles, films and sheets and, in particular, to a process for producing such a polyethylene terephthalate as to cause metal mold staining upon the molding to occur difficultly.

BACKGROUND OF THE TECHNIQUE

For the material of the containers for, such as condiments, vegetable oils, drinks, cosmetics and detergents, various resins have hitherto been employed in accordance with each specific contents charged therein and with the purpose of the use thereof.

Among them, polyethylene terephthalate is particularly suitable as the material of containers to be charged with drinks, such as juices, refrigerants and carbonate drinks, since it is superior in the mechanical strength, heat resistance, transparency and gas-barriering property.

The polyethylene terephthalate can be obtained by esterifying dicarboxylic acids including mainly terephthalic acid or ester-forming derivatives of such acids with glycols including mainly ethylene glycol or with ester-forming derivatives of such glycols and subjecting the resulting esters to a liquid phase polycondensation and, then, to a solid phase polycondensation. In general, such polyethylene terephthalate is supplied to a molding machine, such as an injection molding machine, to shape it into a preform for a hollow molded article, whereupon the preform is placed in a metal mold to subject it to an expansion blow molding or, further, to a heat treatment (heat setting) to form into a hollow molded container.

Conventional polyethylene terephthalates obtained by the production process described above contain oligomers, such as cyclic trimer etc., which cause staining of the metal mold by adhering on, for example, the inner surface of the metal mold for blow molding, the gas exhaustion outlet and vent pipe, or on the vent portion of the metal mold of injection molding machine mentioned above.

Such a metal mold staining may cause a rough surface or a whitening of the resulting bottles. When whitening of bottles occurs, such bottles must be discarded. Therefore, such metal mold staining must be removed at frequent intervals upon molding bottles using a hitherto known polyethylene terephthalate, whereby a large problem is brought about in that the bottle productivity decreases considerably.

The principal cause for the occurrence of metal mold staining upon molding is due to an increase in the total amount of the oligomers, such as cyclic trimer etc., resulting from the formation of large amount of such oligomers during the molding with a polyethylene terephthalate. In order to prevent this, a measure has been proposed for markedly suppressing the increase of total amount of oligomers, such as cyclic trimer etc., during the molding, by causing the polyethylene terephthalate resulting from the solid phase polycondensation to contact with water (Japanese Patent Kokai No. 47830/1991).

In conventional processes for producing polyethylene terephthalate, a polycondensation catalyst, such as germanium dioxide or the like, is employed, which is difficultly soluble in the reaction system and, hence, has been customed to be added to the reaction system after having been dissolved using an alkaline solubilizing agent, such as tetraethylammonium hydroxide (EAH).

The inventors carried out sound research as to polyethylene terephthalates and to the process for their production, in order to obtain such a polyethylene terephthalate in which the amount of oligomers formed during the molding is further decreased and the metal mold staining occurs difficultly, whereby it was discovered that the lower the amount of the alkaline solubilizing agent for dissolving the polycondensation catalyst, the more was the increase in the total amount of oligomers, such as cyclic trimer, in the resulting polyethylene terephthalate upon the molding able to be suppressed, whereupon the present invention was led to completion.

An object of the present invention is to solve the problem incidental to the prior technique mentioned above and to provide a process for producing such a polyethylene terephthalate that causes the amount of oligomers formed to be decreased and causes the metal mold staining to occur difficultly.

DISCLOSURE OF THE INVENTION

The process for producing the polyethylene terephthalate according to the present invention comprises, an esterification stage in which dicarboxylic acids including mainly terephthalic acid or ester-forming derivatives of such acids are esterified with glycols including mainly ethylene glycol or with ester-forming derivatives of such glycols, a liquid phase polycondensation stage in which the esterified product obtained in the esterification stage is subjected to a polycondensation in a liquid phase containing a polycondensation catalyst and having a content of an alkaline solubilizing agent of 0.4 mole or less per mole of the polycondensation catalyst with heating, a solid phase polycondensation stage in which the polycondensation product obtained in the liquid phase polycondensation stage is heated at a temperature below the melting point of the product in an inert atmosphere, and an aqua-treatment stage in which the polycondensation catalyst is deactivated by contacting the polycondensation product obtained in the solid phase polycondensation stage with water.

The Polyethylene Terephthalate

For the polyethylene terephthalate produced by the process according to the present invention, it is desirable that the amount of the olygomers including the cyclic trimer with a structural unit represented by the formula (I)

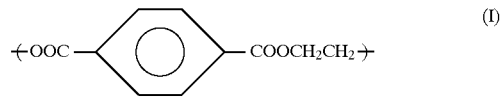

is usually 0.5% by weight or less, preferably 0.45% by weight or less and more preferably 0.4% by weight or less. Here, it is desirable that the amount $W_0$ (in weight %) of an oligomer (cyclic trimer) in the polyethylene terephthalate and the amount $W_1$ (in weight %) of the oligomer in the polyethylene terephthalate after having been heated at a temperature of 290° C. to melt and been shaped into a staged rectangular plate as will be explained later are such that $W_1-W_0 \leq 0.1$, preferably $W_1-W_0 \leq 0.05$ and more preferably $W_1-W_0 \leq 0.03$.

The polyethylene terephthalate obtained according to the present invention permits to suppress markedly the increase in the amount of oligomers upon molding into, for example, bottles, and, therefore, causes metal mold staining to occur difficultly. Namely, the amount of the oligomers, such as cyclic trimer etc., is difficult to increase and, thus, metal mold staining occurs difficultly on molding a hollow shaped container by supplying the polyethylene terephthalate to a molding apparatus, such as an injection molding machine, to mold it into a preform of a hollow molded article and placing this preform in a metal mold of a predetermined geometry to subject to an expansion blow molding, before it is heat-set.

Production of the Polyethylene Terephthalate

Now, the process for the production of the polyethylene terephthalate according to the present invention is described along with the process stages in order.

(The Raw Materials)

The process for producing the polyethylene terephthalate according to the present invention uses dicarboxylic acids including mainly terephthalic acid or ester-forming derivatives of such acids and glycols including mainly ethylene glycol or ester-forming derivatives of such glycols as the raw materials and is effected via an esterification and a polycondensation. Here, it is possible either that terephthalic acid or its ester-forming derivative is subjected to the polycondensation with ethylene glycol or its ester-forming derivative or that these components are subjected to co-polycondensation together with 20 mole % or less of other dicarboxylic acid(s) or ester-forming derivative(s) thereof and/or other glycol(s) or ester-forming derivative(s) thereof.

As the dicarboxylic acids to be used in the co-polycondensation other than terephthalic acid, there may be enumerated concretely for example, aromatic dicarboxylic acids, such as, phthalic acid, isophthalic acid, naphthalenedicarboxylic acid, diphenyldicarboxylic acid and diphenoxyethanedicarboxylic acid; aliphatic dicarboxylic acids, such as, adipic acid, sebacic acid, azelaic acid and decanedicarboxylic acid; and alicyclic dicarboxylic acids, such as, cyclohexanedicarboxylic acid and so on.

As the glycols to be used in the co-polycondensation according to the present invention other than ethylene glycol, there may be enumerated concretely, for example, aliphatic glycols, such as, trimethylene glycol, propylene glycol, tetramethylene glycol, neopentyl glycol, hexamethylene glycol and dodecamethylene glycol; alicyclic glycols, such as cyclohexane dimethanol etc.; and aromatic diols, such as, bisphenols, hydroquinone and 2,2-bis(4-β-hydroxyethoxyphenyl) propane.

As the ester-forming derivatives of terephthalic acid and other dicarboxylic acids, there may be enumerated, for example, lower alkyl esters and phenyl esters of terephthalic acid and other dicarboxylic acids. As the ester-forming derivatives of ethylene glycol and other glycols, there may be enumerated, for example, monocarboxylic acid esters of ethylene glycol and other glycols.

As the dicarboxylic acids including mainly terephthalic acid or the ester-forming derivatives of such acids, those in which terephthalic acid or its ester-forming derivative is included in a proportion of at least 90 mole % and other dicarboxylic acids are included in a proportion of at the highest 10 mole % are preferred. As the glycols including mainly ethylene glycol or the ester-forming derivatives of such glycols, those in which ethylene glycol is included in a proportion of at least 90 mole % and other glycols are included in a proportion of at the highest 10 mole % are preferred.

(The Esterification Stage)

The raw materials comprising the dicarboxylic acids including mainly terephthalic acid (hereinafter referred to simply as the dicarboxylic acids) or their ester-forming derivatives and the glycols including mainly ethylene glycol (hereinafter referred to simply as the glycols) or their ester-forming derivatives are subjected to an esterification in the esterification stage.

Concretely, a slurry containing the dicarboxylic acids or their ester-forming derivatives and the glycols or their ester-forming derivatives is first prepared. This slurry may preferably contains 1.02–1.4 moles, preferably 1.03–1.3 moles of the glycols or their ester-forming derivatives per mole of the dicarboxylic acids or their ester-forming derivatives. This slurry is supplied to the esterification stage continuously to subject to the esterification.

The esterification is carried out preferably using an apparatus having at least two esterification reactors connected in series under a condition in which the glycols are refluxed, while exhausting the water formed by the reaction out of the system by a rectification column. The reaction condition during the esterification is such that, in the first step esterification, the temperature is usually 240°–270° C., preferably 245°–265° C. and the pressure is usually 0.2–3 $Kg/cm^2$ gauge, preferably 0.5–2 $Kg/cm^2$ gauge and, in the final step esterification, the temperature is usually 250°–280° C., preferably 255°–275° C. and the pressure is usually 0–1.5 $Kg/cm^2$ gauge, preferably 0–1.3 $Kg/cm^2$ gauge.

Therefore, if the esterification is carried out in two steps, the esterification conditions in the first and the second (final) steps are as given above. In the case of carrying out in three or higher steps, the esterification conditions in the steps from the second to the one before final step may preferably be intermediate between that of the above first step and that of the above final step.

For instance, if the esterification is carried out in three steps, the reaction temperature in the second step of esterification is usually 245°–275° C., preferably 250°–270° C., and the pressure therein is in the usual range of 0–2 $Kg/cm^2$ gauge, preferably 0.2–1.5 $Kg/cm^2$ gauge. There is no special limitation for the degree of conversion of the esterification in each step, though it is preferable that the increments and the conversion degrees between the steps are distributed smoothly over the steps and, in addition, it is preferable that the conversion in the final step esterification reaches usually a value of 90% or higher, preferably 93% or higher.

Through the esterification stage, an esterification product is obtained, which has usually a number average molecular weight of 500–5,000.

Such an esterification can also be realized without incorporating any additive other than the dicarboxylic acids and the glycols or, alternatively, in the co-existence of the catalyst and stabilizer for the polycondensation described below. The polycondensation catalyst is preferably used in the absence of the alkaline solubilizing agent. However, when the polycondensation catalyst is used in accompaniment with the alkaline solubilizing agent, it is used together with the alkaline solubilizing agent of an amount as scarce as possible, as described later.

In the present invention, at least one element $M_2$ selected from the group consisting of Ti, Zn, Mg, Mn, Ca, Co, Cu and Ni and/or a compound of such element can be used as a promotor of the deactivation of the polycondensation catalyst explained later, wherein such promotor can be added to the esterification stage and/or to the liquid phase polycondensation stage explained later. In case the element $M_2$ and/or the compound containing such element is used, it is added preferably in accordance with the present invention, in particular, to the esterification stage, while it is possible to add it to the liquid phase polycondensation stage described later, or further, to both the stages in each allotted amount. Also, it is possible to add it either successively in small amounts or all at once or intermittently in several portions and no limitation is given to the manner of addition thereof.

The above-mentioned at least one element $M_2$ selected from the group consisting of Ti, Zn, Mg, Mn, Ca, Co, Cu and Ni may be used as an aqueous solution or a powder. As the compounds containing the element $M_2$, for example, salts of said element $M_2$, such as an acetate, and alkoxides may be enumerated.

Here, it is preferable, that the element $M_2$, such as Zn etc., or the compound containing the element $M_2$ is used in such an amount that the mole ratio of the element $M_2$ to a metal element $M_1$ originated from the polycondensation catalyst as explained later $(M_2/M_1)$ will usually be 0.01–50, preferably 0.05–20, though the amount of the element $M_1$ originated from the polycondensation catalyst to be used cannot simply be determined, since the element $M_1$, for example, Ge may volatilize in a form of, such as $GeO_2$ or GeO.

When such an element $M_2$ and/or a compound containing said element is added to the esterification stage and/or to the liquid phase polycondensation stage which is described below, the deactivation of the polycondensation catalyst in the aqua-treatment of the granular polyethylene terephthalate described later can be promoted and the time required for the aqua-treatment can be decreased.

(The Liquid Phase Polycondensation Stage)

The esterification product obtained in the esterification stage is supplied to the liquid phase polycondensation stage and is heated to a temperature above the melting point of the polyethylene terephthalate under a reduced pressure in the presence of a polycondensation catalyst to subject it to a polycondensation. The glycols formed thereby are distilled off from the system.

The polycondensation reaction in liquid phase can be effected either in a single step or in a plurality of steps. In the case of plural steps, the polycondensation reaction condition is such that, in the polycondensation of the first step, the reaction temperature is usually 250°–290° C., preferably 260°–280° C., and the pressure is usually 500–20 Torr, preferably 200–30 Torr, and in the polycondensation of the final step, the reaction temperature is usually 265°–300° C., preferably 270°–295° C., and the pressure is usually 10–0.1 Torr, preferably 5–0.5 Torr.

In the case where the polycondensation is carried out in two steps, the polycondensation reaction conditions in the first and the second (final) steps are in the above-mentioned ranges, respectively. In the case of carrying out in three steps or more, the reaction conditions in the polycondensations in the steps from second to the one before the final step are preferably intermediate conditions between that of the said first step and that of the said final step.

For example, if the polycondensation is realized in three steps, the reaction temperature is usually 260°–295° C., preferably 270°–285° C., and the pressure is usually in the range of 50–2 Torr, preferably 40–5 Torr, in the second step reaction. While there is no special restriction for the intrinsic viscosity achieved in each of these polycondensation steps, it is preferable that the degree of increase of the intrinsic viscosity (IV) in each step is distributed smoothly. And it is desirable that the intrinsic viscosity (IV) of the polyethylene terephthalate obtained from the polycondensation reactor of the final step is usually in the range of 0.35–0.80 dl/g, preferably 0.45–0.75 dl/g, more preferably 0.55–0.75 dl/g.

In this specification, the intrinsic viscosity is calculated from the solution viscosity determined by dissolving 1.2 g of the polyethylene terephthalate in 15 cc of o-chlorophenol with heating, then, cooling and measuring at 25° C.

The density of the polyethylene terephthalate is desirably 1.37 g/cms or higher, though it is in usual not specifically restricted.

In this specification, the density of the polyethylene terephthalate is measured at a temperature of 23° C. by a density gradient tube using a mixed solvent of carbon tetrachloride and heptane.

(The Catalyst, Stabilizer and Alkaline Solubilizer)

The polycondensation is carried out in liquid phase in the presence of a polycondensation catalyst. While it is preferable that the alkaline solubilizing agent for solubilizing the catalyst is not contained in the liquid phase, a small amount of the alkaline solubilizing agent may occasionally be contained. A stabilizing agent may be used together with the polycondensation catalyst in the present invention.

As the polycondensation catalyst, germanium compounds, such as germanium dioxide, germanium tetraethoxide and germanium tetra-n-butoxide; antimony catalysts, such as antimony trioxide; and titanium catalysts, such as titanium tetrabutoxide, may be used. Among these polycondensation catalysts, use of germanium dioxide is preferred, since the hue and the transparency of the polyethylene terephthalate formed are superior.

As the stabilizer, phosphates, such as, trimethyl phosphate, triethyl phosphate, tri-n-butyl phosphate, trioctyl phosphate, triphenyl phosphate and tricresyl phosphate; phosphates, such as, triphenyl phosphite, trisdodecyl phosphite and trisnonylphenyl phosphite; acidic phosphates, such as, methyl acid phosphate, isopropyl acid phosphate, butyl acid phosphate, dibutyl phosphate, monobutyl phosphate and dioctyl phosphate; and phosphorus compounds, such as phosphoric acid and polyphosphoric acids, are used. The using proportion of the catalysts or stabilizers is usually in the range of 0.0005–0.2% by weight, preferably 0.001–0.05% by weight, for the catalyst, based on the weight of the mixture of the dicarboxylic acids and the glycols, for the catalyst, or is, for the stabilizer, usually in the range of 0.001–0.1% by weight, preferably 0.002–0.02% by weight, as the weight of the phosphorus atom in the stabilizer. Here, the calculation is made, in the case of, for example, using two or more catalysts based on germanium together or using a catalyst based on germanium and a catalyst based on antimony together, as the total weight of the metals in the entire catalyst amount.

Concerning the manner for supplying the polycondensation catalyst and the stabilizer mentioned above, they may be supplied either to the process stage of esterification or to the reactor of the first step of the polycondensation. In the liquid phase polycondensation stage, the polycondensation catalyst and the stabilizer are used in a state dissolved or dispersed in the reaction liquid phase.

In the polycondensation stage of the present invention, while it is preferable to dissolve or disperse the polycondensation catalyst in the liquid phase without using the alkaline solubilizing agent for the polycondensation catalyst, it is also permissible to add the alkaline solubilizing agent in an amount of 0.4 mole or less per mole of polycondensation catalyst, preferably 0.3 mole or less, especially preferably 0.2 mole or less per mole of polycondensation catalyst.

In the polycondensation stage, while the esterification product of the esterification stage is subjected to polycondensation preferably in a state of larger amount of the polycondensation catalyst, the amount of the catalyst can be rendered larger in the present invention by dissolving or dispersing all or a part of the polycondensation catalyst in a glycol.

For the manner of adding the polycondensation catalyst under dissolution in a glycol without using alkaline solubilizing agent, the following methods are preferable:

1. A method in which a catalyst soluble in glycols is dissolved in a glycol and is added, as shown in Japanese Patent Publication No. 13239/1968.

As the catalyst soluble in glycols, there may be enumerated, for example, one which is obtained by converting crystalline $GeO_2$ into non-crystalline $GeO_2$ by a solubilizing treatment by melting and quenching. In this method, 50–200 parts by weight of the glycol are usually used per one part of the solubilizing treated catalyst. It is preferable on dissolving the catalyst to heat in order to increase the dissolved amount of the solubilizing treated catalyst and, for example, can be dissolved at normal temperature –200° C. before being added.

2. A method in which a catalyst, such as crystalline $GeO_2$, is dissolved in a glycol using a chelating agent, such as a carboxylic acid or so on, and is then added, as shown in Japanese Patent Publication Nos. 42493/1971, 6746/1972 and 32317/1974.

In this method, the catalyst can be added by dissolving it in 10–200 times weight of water in the presence of a chelating agent and, then, dissolving in the glycol of an amount of 0.5–5 times weight of the water or after further subjecting to water removal. As the carboxylic acids which can be used for such a chelating agent, there may be enumerated oxalic acid, tartaric acid, citric acid and so on. The amount of the chelating agent used is preferably 0.5–5 moles per mole of $GeO_2$.

Alternatively, it is also possible to resort to the following methods of addition of the polymerization catalyst.

3. A method in which the polycondensation catalyst is added in a state of a slurry in which it is dispersed in a glycol.

4. A method in which the polycondensation catalyst is partly dissolved in an excess amount of a glycol and is added.

5. A method in which the polycondensation catalyst is dissolved or suspended in water and is added.

6. A method in which the polycondensation catalyst is added as a powder as such.

In this method, the catalyst is added directly to the liquid phase of the reaction system and is dissolved or dispersed.

7. A method in which the glycols delivered from the polycondensation stage which contain the polymerization catalyst is used by recirculating it to the esterification stage or to the polycondensation stage, as taught in Japanese Patent Kokai No. 110120/1980.

In this method, the delivered glycols can be used as such or after having been concentrated so as to reach a Ge concentration of 0.1–5% by weight.

In the case where a glycol is used as the solvent or the dispersing medium in the above-mentioned methods, glycols as the raw material can be used. Preference is given for the method in which a liquor having dissolved or dispersed therein the polycondensation catalyst is added to the esterification stage or to the liquid phase polycondensation stage than the method in which the polycondensation catalyst is added directly to the liquid phase in the reaction stage to dissolve or disperse therein.

It is preferable, if the esterification product is subjected to polycondensation in a liquid phase in which the content of the alkaline solubilizing agent for the polycondensation catalyst is 0.4 mole or less per one mole of the polycondensation catalyst, since the oligomers, such as cyclic trimer etc., are formed only in a small amount upon the molding with the polyethylene terephthalate. Thus, the total amount of the oligomers, such as cyclic trimer etc., contained in the polyethylene terephthalate will not increase, whereby the metal mold staining is reduced and the time required for the aqua-treatment, which is described later, is decreased.

While it is more preferable as the amount of the alkaline solubilizing agent is more lower, it may be used in an amount of 0.4 mole or less relative to the polycondensation catalyst. As the alkaline solubilizing agent, tertiary amines, such as triethylamine, tri-n-butylamine and benzyldimethylamine, and quaternary ammonium hydroxides, such as tetraethylammonium hydroxide (EAH), tetra-n-butylammonium hydroxide and trimethylbenzylammonium hydroxide, may be used.

Thus, the polyethylene terephthalate obtained from the final polycondensation reactor may contain dicarboxylic acid units other than the terephthalic acid unit and diol units other than the glycol unit in an amount of 20 mole % or less, wherein it is desirable that a particularly preferred polyethylene terephthalate has a content of the ethylene terephthalate component unit (a) represented by the formula (I)

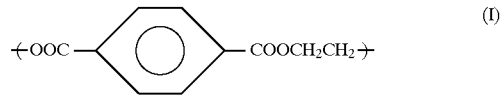
(I)

within a range of 95.0–99.0 mole % and a content of the dioxyethylene terephthalate component unit (b) represented by the formula (II)

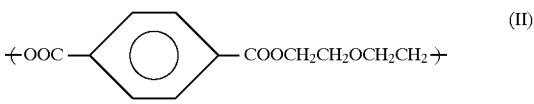
(II)

within a range of 1.0–5.0 mole %.

The polyethylene terephthalate obtained in this manner from the final polycondensation reactor is usually shaped into a granular form (form of chips) by a melt extrusion molding.

It is desirable that such a granular polyethylene terephthalate has usually an average particle size of 2–5 mm, preferably 2.2–4.0 mm.

The granular polyethylene terephthalate thus having passed the liquid phase polycondensation stage is subjected to a solid phase polycondensation stage.

(The Solid Phase Polycondensation Stage)

The granular polyethylene terephthalate supplied to the solid phase polycondensation stage may preliminarily be heated at a temperature lower than the temperature for carrying out the solid phase polycondensation to effect a preliminary crystallization, before being supplied to the solid phase polycondensation stage.

Such a preliminary crystallization stage may either be realized in the case of using a continuous apparatus usually by heating the granular polyethylene terephthalate at a temperature of 120°–200° C., prefrably 130°–180° C., for 1 minute–4 hours, after it has been dried, or by heating the granular polyethylene terephthalate usually at a temperature of 120°–200° C. for 1 minute or longer under an atmosphere of water steam or under a steam-containing inert gas atmosphere or an atmosphere of steam-containing air. In the case of using a batch-wise apparatus, it is necessary to intensify the drying of a granular polyethylene terephthalate, wherein an increase in the heating time etc., may be adopted by effecting drying and a preliminary crystallization.

The solid phase polycondensation stage to which the granular polyethylene terephthalate is supplied is constituted of at least one step, wherein the solid phase polycondensation is effected under such a condition that the polycondensation temperature is usually 190°–230° C., preferably 195°–225° C. and the pressure is usually 1 Kg/cm² gauge–10 Torr, preferably from normal pressure to 100 Torr, usually for 1–50 hours, preferably for 5–30 hours and more preferably for 7–25 hours, under an atmosphere of an inert gas, such as nitrogen gas, argon gas or carbon dioxide gas. Among these inert gases, nitrogen gas is preferred.

It is desirable that the mole ratio of the metal $M_1$ originated from the polycondensation catalyst contained in the (granular) polyethylene terephthalate obtained in this manner to at least one element $M_2$ selected from the group consisting of Ti, Zn, Mg, Mn, Ca, Co, Cu and Ni ($M_2/M_1$) is 0.01–50, preferably 0.05–20.

It is desirable that the intrinsic viscosity of the granular polyethylene terephthalate is usually 0.50 dl/g or higher, preferably 0.54 dl/g or higher, more preferably 0.70 dl/g or higher, especially preferably 0.72 dl/g or higher.

It is desirable that the density of this polyethylene terephthalate is usually 1.37 g/cm³ or higher, preferably 1.38 g/cm³ or higher, more preferably 1.39 g/cm³ or higher.

It is desirable that the amount of the oligomers including the cyclic trimer of

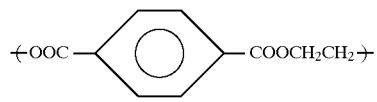 (I)

is ususally 0.5% by weight or less, preferably 0.45% by weight or less, more preferably 0.4% by weight or less.

(The Aqua-Treatment Stage)

The granular polyethylene terephthalate obtained via the solid phase polycondensation stage is subjected to the aqua-treatment, which is carried out by contacting the granular polyethylene terephthalate with water, water steam, a steam-containing inert gas, steam-containing air or the like.

The contact of the granular polyethylene terephthalate with water is effected by immersing the granular polyethylene terephthalate in water of 50°–100° C. for 3 minutes–5 hours, especially preferably in hot water of 80°–100° C. for 5 minutes–4 hours.

The contact of the granular polyethylene terephthalate with steam or a steam-containing gas is effected usually by contacting the granular polyethylene terephthalate with water steam, wherein steam, a steam-containing inert gas or steam-containing air of a temperature of 70°–150° C., preferably 70°–110° C., is supplied in an amount of 0.5 g per one kg of the granular polyethylene terephthalate or caused to co-exist.

The contact of the granular polyethylene terephthalate with water steam is performed usually for a period of 5 minutes–10 hours.

Below, the aqua-treatment is exemplified in realizing industrially, though not restricted thereto. Here, the manner for performing the treatment may be either in a continuous way or batchwise.

When the aqua-treatment of the granular polyethylene terephthalate is performed batchwise, a treating apparatus of a silo-type is employed. Namely, the granular polyethylene terephthalate is received in a silo and is brought into contact with water batchwise by supplying water thereto. Alternatively, the granular polyethylene terephthalate is received in a rotary cylinder type contacting treatment apparatus to subject to the aqua-treatment while rotating the rotary cylinder, in order to effect the contact more efficiently.

In the case where the granular polyethylene terephthalate is subjected to the aqua-treatment continuously, the aqua-treatment can be realized in such a way that the granular polyethylene terephthalate is received in a tower type treating apparatus continuously via its top and water is supplied thereto continuously so as to flow in a parallel or a counter current relationship relative to the flow of the granular polyethylene terephthalate, in order to effect contact with the granular polyethylene terephthalate. Thereafter, the granular polyethylene terephthalate subjected to the aqua-treatment is dewatered in a dewatering device, such as vibrational sieving machine or Simonkarter, before it is transferred to the subsequent drying stage. When it is treated with water steam or with a steam-containing gas, it can be transferred as such to the drying stage.

As the apparatus for drying the granular polyethylene terephthalate subjected to the aqua-treatment, a conventionally employed drying treatment apparatus for polyethylene terephthalate can be used. As the manner for continuously drying the granular polyethylene terephthalate, a hopper-type aeration drier is usually employed, in which the granular polyethylene terephthalate is supplied at an upper portion and a drying gas is passed thereto at a lower portion. For a practice for drying efficiently with a reduced amount of the drying gas, a continuous drier of rotary disc heating system is chosen, with which the granular polyethylene terephthalate can be dried indirectly by supplying the rotary disc or the outer jacket with a heating steam or other heating medium while passing a smaller amount of the drying gas thereto. For the drier for a batchwise drying of the granular polyethylene terephthalate, a double corn type rotary drier is employed, with which the granular polyethylene terephthalate can be dried under vacuum or by passing a smaller amount of the drying gas under vacuum. Alternatively, on using the double corn type rotary drier, the granular polyethylene terephthalate may also be dried by passing a drying gas under the atmospheric pressure.

As the drying gas, dried nitrogen gas or desiccated air is preferred from the point of view of preventing reduction of the molecular weight of the polyethylene terephthalate due to hydrolysis, while atmospheric air may be permitted.

By the polyethylene terephthalate which has been subjected to the aqua-treatment, an increase of the oligomers during the molding into, for example, bottles is markedly suppressed. This is confirmed by measuring the amount of the oligomers after the staged rectangular plates have been molded, as described later, with the polyethylene terephthalate which was aqua-treated in the above-mentioned way and heated to melt at a temperature of 290° C.

The amount $W_0$ (in weight %) of the oligomers contained in the aqua-treated polyethylene terephthalate including mainly the cyclic trimer of

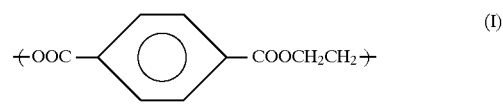 (I)

and the amount $W_1$ (in weight %) of the oligomers after the polyethylene terephthalate has been heated at a temperature of 290° C. and the above-mentioned staged rectangular plates have been molded therewith are preferably such that $W_1-W_0 \leq 0.1$, preferably $W_1-W_0 \leq 0.05$, more preferably $W_1 W_0 \leq 0.03$. Here, it is desirable that the amount $W_0$ (in weight %) of the oligomers contained in the polyethylene terephthalate before being subjected to the molding into the staged rectangular plates is usually 0.5% by weight or less, preferably 0.45% by weight or less, more preferably 0.4% by weight or less.

According to the present invention, the amount of the oligomers increased on the molding of the staged rectangular plate with a polyethylene terephthalate can be suppressed by performing the liquid phase polycondensation stage in such a manner that the esterification product is subjected to a polycondensation with heating in a liquid phase containing a polycondensation catalyst and having a content of an alkaline solubilizing agent of 0.4 mole or less per mole of the polycondensation catalyst, which is followed by the solid phase polycondensation stage and the aqua-treatment stage to obtain the polyethylene terephthalate, and the so-obtained polyethylene terephthalate is heated at 290° C. to melt to subject to the molding.

The fact that increase of the oligomers, such as cyclic trimer etc., contained in the polyethylene terephthalate upon the molding can be suppressed by subjecting the polyethylene terephthalate to the aqua-treatment may be due to the fact that the alkaline solubilizing agent will not obstruct the deactivation of the polycondensation catalyst when the polyethylene terephthalate obtained by subjecting the esterification product to a polycondensation with heating in a liquid phase containing the polycondensation catalyst and having a content of the alkaline solubilizing agent of 0.4 mole or less per one mole of the polycondensation catalyst, so that the polycondensation catalyst based on, for example, germanium contained in the polyethylene terephthalate will promptly be deactivated and, therefore, the polyethylene terephthalate will scarcely suffer from decomposition or a transesterification, whereby the amount of the oligomers, such as cyclic trimer etc., becomes decreased.

Thus, the polyethylene terephthalate obtained by the process according to the present invention is lean in the amount of the oligomers, such as cyclic trimer etc., so that a metal mold staining which is due to adhesion of the oligomers, such as cyclic trimer etc., onto the metal mold will difficultly occur when a preform for a hollow molded container is molded by supplying this polyethylene terephthalate to a molding apparatus, such as an injection molding machine, and this preform is placed in a metal mold of predetermined geometry to subject it to an expansion blow molding and then to heat setting to form into the hollow molded container.

Since the process for producing polyethylene terephthalate according to the present invention comprises, as described above, an esterification stage, a liquid phase polycondensation stage wherein the esterification product obtained in the esterification stage is subjected to a polycondensation in a liquid phase which contains a polycondensation catalyst and has a content of an alkaline solubilizing agent of 0.4 mole or less per one mole of the the polycondensation catalyst, a solid phase polycondensation stage and an aqua-treatment stage, the polyethylene terephthalate obtained by this process contains a lower amount of the oligomers, such as cyclic trimer etc., formed during the molding and, in addition, a lower total amount of the oligomers contained upon the molding, so that a metal mold staining does dificultly occur upon the molding.

Therefore, the polyethylene terephthalate obtained by the process for producing polyethylene terephthalate according to the present invention permits to improve the productivity of the molded articles, such as bottles, films and sheets, without necessitating incorporation of frequent cleaning procedures and, in addition, can afford to attain prevention of whitening (staining) of the resulting molded article.

THE BEST MODE FOR REALIZING THE INVENTION

Figure 1:
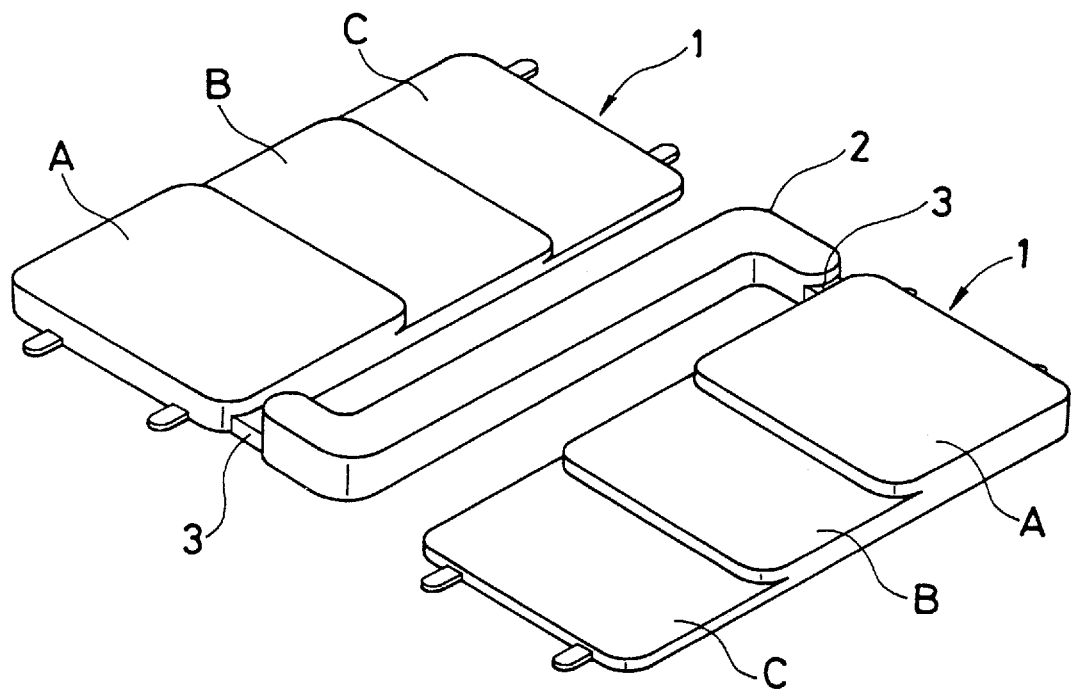
FIG. 1 is a perspective view of a molded article of the staged rectangular plate.

Below, the present invention is described by way of Examples, though the present invention is not restricted to these Examples.

Method for Determining Oligomer Content by the Staged Rectangular Plate

Description is directed to the procedures for performing the injection molding to produce a molded product of testing with the polyethylene terephthalate and for determining the amount of oligomers contained in this molded product.

First, 2 kg of a granular polyethylene terephthalate (a pelletted polyethylene terephthalate), of which the oligomer content has preliminarily been determined (with a determined value of $W_0$ %), as a raw material are dried on a shelf plate type drier under the condition of a temperature of 140° C. and a pressure of 10 Torr for a period of 16 hours or more to settle the moisture content in the granular polyethylene terephthalate at a value of 50 ppm or lower.

Then, the so-dried granular polyethylene terephthalate is subjected to molding on an injection molding machine M-70A made by Meiki Co., Ltd., while supplying thereto nitrogen gas of a dew point of minus 70° C. at an upper portion of the hopper and at the portion of the screw feeder shoot each at a rate of 5 normal cubic meters per hour, under the conditions of a settled barrel temperature of 290° C., molding machine temperatures in rear part/central part/front part of the cylinder head/nozzle top, respectively, of 260° C./290° C./290° C./300° C. and a metal mold cooling temperature of 15° C., to obtain a molded article of a form of a staged rectangular plate.

The injection molding of the molded product of staged rectangular plate is preformed by supplying the dried granular polyethylene terephthalate from the hopper to the injection molding machine in such a manner that the metering time be 12 seconds and the injection time be 60 seconds. The residence time of the molten resin in the molding machine is settled at about 72 seconds. The weight of one staged rectangular plate is 75 grams and either one of 11th to 15th plates after the commencement of the injection molding is used as the sample for the oligomer determination.

The molded product (1) of staged rectangular plate has a configuration as shown in FIG. 1, in which the thicknesses of the thickest part (A), the medium thick part (B) and the thin part (C) are about 6.5 mm, about 5 mm and about 4 mm, respectively. The molded product (1) of staged rectangular plate is present in the as-molded state in a form in which two molded staged rectangular plates are joined together via the portions corresponding to the runner (2) and the gate (3) of the mold, of which the thin part (C) of one plate (1) is used as the sample.

Thus, the thin part (C) with the thickness of 4 mm of the molded staged rectangular plate (1) is cut into chips, which are served for the samples for oligomer determination to determine the amount ($W_1$ in weight %) of the oligomers.

On the other hand, the amount of the oligomers contained in the polyethylene terephthalate is determined in the following manner.

Thus, a predetermined amount of the polyethylene terephthalate is dissolved in o-chlorophenol, whereupon linear polyethylene terephthalates are removed by re-deposition using tetrahydrofuran and filtration. Then, the so-obtained filtrate is supplied to a liquid chromatography (LC 7A of Simazu Corp.) to determine the amount of the oligomers contained in the polyethylene terephthalate. By dividing this value by the amount of the polyethylene terephthalate used for the determination, the amount of the oligomer (in weight %) is calculated.

EXAMPLE 1

Using a continuous polycondensation apparatus composed of the first, second, third, fourth and fifth reactors each of vessel type and the sixth reactor of biaxial rotary type horizontal reactor, a continuous polycondensation was carried out in the manner as given below to produce a polyethylene terephthalate.

To the first reactor in which 3,750 parts by weight of a reaction liquid were included preliminarily and were maintained under a condition of 255° C. and under a nitrogen atmosphere of 1.7 Kg/cm$^2$ gauge with agitation, a slurry prepared by mixing 1,437 parts by weight of high purity terephthalic acid and 645 parts by weight of ethylene glycol together in every hour was supplied continuously to conduct the first step esterification. In the first step esterification, a mixed liquor of 203 parts by weight of water and 3 parts by weight of ethylene glycol was distilled off. Here, the first step esterification was controlled so that the average residence time of the reaction mixture was 2.0 hours and the reaction mixture was guided continuously to the second reactor maintained under a condition of 260° C. and 0.8 Kg/cm$^2$ gauge with agitation.

In the second reactor, a homogeneous solution of 0.35 part by weight of germanium dioxide and 32 parts by weight of ethylene glycol (which was used as a solution of a concentration of 1% by weight of GeO$_2$ prepared by dissolving non-crystalline GeO$_2$ in ethylene glycol with heating) was supplied thereto in every hour continuously, while a mixed liquor of 84 parts by weight of water and 7 parts by weight of ethylene glycol was distilled off in every hour continuously therefrom to succeed the second step esterification. Here, the second step esterification was controlled so that the average residence time of the reaction mixture was 2.0 hours and the reaction mixture was guided continuously to the third reactor which was maintained under a condition of 265° C. and ordinary pressure with agitation.

In the third reactor, a homogeneous solution in which 1.23 parts by weight of trimethyl phosphate and 22 parts by weight of ethylene glycol were mixed together was supplied thereto in every hour continuously, while a mixed liquor of 21 parts by weight of water and 38 parts by weight of ethylene glycol was distilled off in every hour continuously therefrom to succeed the third step esterification.

Here, the third step esterification was controlled so that the average residence time of the reaction mixture was 2.0 hours and the reaction mixture was guided continuously to the fourth reactor which is maintained under a condition of 275° C. and 70 mmHg with agitation. In the fourth reactor, a mixed liquor of 62 parts by weight of ethylene glycol and 6 parts by weight of water was distilled off in every hour continuously to effect the first step liquid phase polycondensation. Here, the first step liquid phase polycondensation was controlled so that the average residence time of the reaction mixture was 1.0 hour and the reaction mixture was guided continuously into the fifth reactor maintained at 280° C. and 5 mmHg with agitation.

In the fifth reactor, a mixed liquor of 26 parts by weight of ethylene glycol and 3 parts by weight of water was distilled off in every hour continuously therefrom to succeed the second step polycondensation. Here, the second step liquid phase polycondensation was controlled so that the average residence time of the reaction mixture was 1.0 hour and the reaction mixture was guided continuously into the sixth reactor which is a biaxial rotary type horizontal reactor and which was maintained under a condition of 282°–285° C. and 1.8 mmHg–2.5 mmHg.

In the sixth reactor, a mixed liquor of 12 parts by weight of ethylene glycol and 1 part by weight of water was distilled off in every hour continuously therefrom to succeed the third step polycondensation. Here, the third step polycondensation was controlled so that the average residence time of the reaction mixture was 2.5 hours and the polycondensation product was taken out of the reactor continuously in a form of a strand by means of a polyester drawing device and was immersed in water to cool it, whereupon it was cut into chips by a strand cutter. The intrinsic viscosity IV of the polyethylene terephthalate obtained by the liquid phase polycondensation as given above, determined in o-chlorophenol at 25° C., was 0.57 dl/g and the content of the dioxyethylene terephthalate thereof was 2.50 mole %.

Then, the polyethylene terephthalate from the liquid phase polycondensation was dried and crystallized in a nitrogen gas atmosphere at 140° C. for 15 hours and was then charged in a tower type solid phase polycondensation reactor to effect a solid phase polycondensation at 205° C. for 15 hours under a nitrogen gas atmosphere. The polyethylene terephthalate obtained in this manner had an intrinsic viscosity determined in o-chlorophenol at 25° C. of 0.80 dl/g, a density of 1.40 g/cm$^3$, a content of the oligomers of 0.29% by weight and a dioxyethylene terephthalate content of 2.53 mole %.

5 kg of the polyethylene terephthalate (A) obtained in this manner were immersed in 6.5 kg of distilled water in a stainless steel vessel.

Then, the stainless steel vessel charged with the distilled water and the polyethylene terephthalate was heated from the outside and was maintained for 2 hours while controlling the internal temperature at 90° C. to subject it to an aqua-treatment, followed by dewatering and drying at 140° C. for 14 hours in nitrogen gas.

The oligomer content of a molding of a staged rectangular plate molded at 290° C. on an injection molding machine (M-70A of Meiki Co., Ltd.) was 0.32% by weight and the increment of the oligomer amount thereof was 0.03% by weight.

EXAMPLE 2

The hot aqua-treatment was carried out in the same way as in Example 1, except that the hot aqua-treatment time for the 5 kg of the polyethylene terephthalate (the solid phase polycondensation product) was changed to 4 hours, whereupon the molding of a staged rectangular plate was effected in the same way as in Example 1 and, on determining the amount of the oligomer contained in this staged plate, this was 0.30% by weight and the increment of the amount of oligomer was 0.01% by weight.

EXAMPLE 3

A polyethylene terephthalate was produced in the same manner as in Example 1, except that the homogeneous solution of germanium dioxide and ethylene glycol to be supplied to the second reactor was prepared by solubilizing crystalline germanium dioxide using tartaric acid in a two-fold molar amount relative to germanium dioxide. The resulting polyethylene terephthalate (the solid phase polycondensation product) had an intrinsic viscosity determined in o-chlorophenol at 25° C. of 0.80 dl/g, a density of 1.40 g/cm$^3$, a content of the oligomers of 0.30% by weight and a dioxyethylene terephthalate content of 2.40 mole %.

5 kg of the so-obtained polyethylene terephthalate (the solid phase polycondensation product) were subjected to a hot aqua-treatment in the same manner as in Example 1 for a treatment time of 2 hours and were processed by molding into a staged rectangular plate in the same manner as in Example 1 in order to determine the amount of the oligomers contained in this staged plate, which gave a value of 0.33% by weight with an increment of the oligomer amount of 0.03% by weight.

Comparative Example 1

A polyethylene terephthalate was produced in the same manner as in Example 1, except that the homogeneous solution of germanium dioxide and ethylene glycol to be supplied to the second reactor was prepared by solubilizing crystalline germanium dioxide in ethylene glycol using tetraethylammonium hydroxide in a 0.5 molar amount relative to germanium dioxide. The resulting polyethylene terephthalate (the solid phase polycondensation product) had an intrinsic viscosity determined in o-chlorophenol at 25° C. of 0.80 dl/g, a density of 1.40 g/cm$^3$, a content of the oligomers of 0.28% by weight and a content of the dioxyethylene terephthalate component of 2.51 mole %.

5 kg of the so-obtained polyethylene terephthalate (the solid phase polycondensation product) were subjected to a hot aqua-treatment in the same manner as in Example 1 for a treatment time of 2 hours and were processed by molding into a staged rectangular plate in the same manner as in Example 1 in order to determine the amount of the oligomers contained in this staged plate, which gave a value of 0.36% by weight with an increment of the oligomer amount of 0.08% by weight.

Comparative Example 2

5 kg of the polyethylene terephthalate (the solid phase polycondensation product) obtained in Comparative Example 1 were subjected to a hot aqua-treatment in the same manner as in Comparative Example 1 except that the hot aqua-treating time was changed to 4 hours and were processed by molding into a staged rectangular plate in the same manner as in Example 1 in order to determine the amount of the oligomers contained in this staged plate, which gave a value of 0.33% by weight with an increment of the oligomer amount of 0.05% by weight.

Comparative Example 3

A polyethylene terephthalate was produced in the same manner as in Comparative Example 1, except that tetra-n-butylammonium hydroxide was used in a 0.5 molar amount relative to germanium dioxide for dissolving germanium dioxide.

The resulting polyethylene terephthalate (the solid phase polycondensation product) had an intrinsic viscosity of 0.80 dl/g, a density of 1.40 g/cm$^3$, a content of the oligomers of 0.30% by weight and a content of the dioxyethylene terephthalate component of 2.48 mole %.

The resulting polyethylene terephthalate was subjected to a hot aqua-treatment in a similar manner as in Example 1 for 2 hours and was processed by molding into a staged rectangular plate in the same manner as in Example 1 in order to determine the amount of the oligomers contained in this staged plate, which gave a value of 0.37% by weight with an increment of the oligomer amount of 0.07% by weight.

We claim:

1. A process for producing polyethylene terephthalate, comprising:

an esterification stage in which dicarboxylic acids including mainly terephthalic acid or ester-forming derivatives of such acids are esterified with glycols including mainly ethylene glycol or with ester-forming derivatives of such glycols, a liquid phase polycondensation stage in which the esterified product obtained in the esterification stage is subjected to a polycondensation in a liquid phase containing a polycondensation catalyst and having a content of an alkaline solubilizing agent of 0.4 mole or less per mole of the polycondensation catalyst with heating, a solid phase polycondensation stage in which the polycondensation product obtained in the liquid phase polycondensation stage is heated at a temperature below the melting point of the product in an inert atmosphere, and an aqua-treatment stage in which the polycondensation catalyst is deactivated by contacting the polycondensation product obtained in the solid phase polycondensation stage with water, wherein the polycondensation catalyst, which is noncrystalline and soluble, is dissolved in the glycols including mainly ethylene glycol, or the polycondensation catalyst, which is crystalline, is dissolved in the glycols including mainly ethylene glycol in the presence of a carboxylic acid-containing chelating agent and the resulting catalyst solution is supplied to the liquid phase polycondensation.

2. A process for producing polyethylene terephthalate, comprising:

an esterification stage in which dicarboxylic acids including mainly terephthalic acid or ester-forming derivatives of such acids are esterified with glycols including mainly ethylene glycol or with ester-forming derivatives of such glycols, a liquid phase polycondensation stage in which the esterified product obtained in the esterification stage is subjected to a polycondensation in a liquid phase containing a germanium compound polycondensation catalyst and having a content of an alkaline solubilizing agent of 0.4 mole or less per mole of the germanium compound polycondensation catalyst with heating, wherein the germanium compound polycondensation catalyst is dissolved in the glycols including mainly ethylene glycol in the presence of a carboxylic acid chelating agent for said catalyst and is supplied to the liquid phase polycondensation, a solid phase polycondensation stage in which the polycondensation product obtained in the liquid phase polycondensation stage is heated at a temperature below the melting point of the product in an inert atmosphere, and an aqua-treatment stage in which the polycondensation catalyst is deactivated by contacting the polycondensation product obtained in the solid phase polycondensation stage with water.

3. The process of claim 2, wherein the chelating agent is in an amount of 0.5 to 5 moles per mole of the germanium compound polycondensation catalyst.

4. The process of claim 2, wherein the germanium compound polycondensation catalyst is crystalline $GeO_2$.

5. The process of claim 2, wherein the carboxylic acid chelating agent is a member selected from the group consisting of oxalic acid, tartaric acid and citric acid.

6. A process for producing polyethylene terephthalate, comprising:

an esterification stage in which dicarboxylic acids including mainly terephthalic acid or ester-forming derivatives of such acids are esterified with glycols including mainly ethylene glycol or with ester-forming derivatives of such glycols, a liquid phase polycondensation stage in which the esterified product obtained in the esterification stage is subjected to a polycondensation in a liquid phase containing a crystalline germanium oxide polycondensation catalyst and having a content of an alkaline solubilizing agent of 0.4 mole or less per mole of the germanium compound polycondensation catalyst with heating, wherein the germanium oxide polycondensation catalyst is dissolved in the glycols including mainly ethylene glycol in the presence of a carboxylic acid chelating agent selected from the group consisting of oxalic acid, tartaric acid and citric acid for said catalyst and is supplied to the liquid phase polycondensation, a solid phase polycondensation stage in which the polycondensation product obtained in the liquid phase polycondensation stage is heated at a temperature below the melting point of the product in an inert atmosphere, and an aqua-treatment stage in which the polycondensation catalyst is deactivated by contacting the polycondensation product obtained in the solid phase polycondensation stage with water.

7. The process of claim 6, wherein the chelating agent is in an amount of 0.5 to 5 moles per mole of the germanium compound polycondensation catalyst.

* * * * *

UNITED STATES PATENT AND TRADEMARK OFFICE
CERTIFICATE OF CORRRECTION

Page 1 of 2

PATENT NO. : 5,830,981
DATED : November 3, 1998
INVENTOR(S) : Hiroshi Koreishi, et. al.

It is certified that error appears in the above-identified patent and that said Letters Patent is hereby corrected as shown below:

Title page, item [56], insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|
| | | 0 | 3 | 8 | 9 | 9 | 4 | 8 | 10/03/90 | EPO | | | | |
| | | | | | | | | | | | | | | |

UNITED STATES PATENT AND TRADEMARK OFFICE
CERTIFICATE OF CORRRECTION

PATENT NO. : 5,850,981
DATED : November 3, 1998
INVENTOR(S) : Hiroshi Koreishi, et. al.

It is certified that error appears in the above-identified patent and that said Letters Patent is hereby corrected as shown below:

Title page, item [56], insert the following:

OTHER DOCUMENTS

|   |   |
|---|---|
|   | CHEMICAL ABSTRACTS, vol. 82, no. 12, 03/24/75 |
|   | PATENT ABSTRACTS OF JAPAN, vol. 18, no. 528, 10/06/94 |
|   | DATABASE WPI, Sec. Ch, Week 9517, AN 95-128426 Derwent Pub. Ltd., London GB |
|   | DATABASE WPI, Sec. Ch, Week 9330, AN 93-240061 Derwent Pub. Ltd., London GB |
|   |   |

Signed and Sealed this

Sixth Day of April, 1999

Attest:

Q. TODD DICKINSON

*Attesting Officer*  Acting Commissioner of Patents and Trademarks